United States Patent [19]

Lautzenhiser et al.

[11] Patent Number: 4,978,899
[45] Date of Patent: Dec. 18, 1990

[54] CONVEYANCE WITH ELECTRONIC CONTROL FOR MOTORS

[76] Inventors: Lloyd L. Lautzenhiser, Lot 6, Concession 12, Carling Township, Nobel, Ontario, Canada, POG 1GO; John L. Lautzenhiser, 110 Bowes Street, Parry Sound, Ontario, Canada, P2A 2L7

[21] Appl. No.: 354,188

[22] PCT Filed: Oct. 29, 1987

[86] PCT No.: PCT/US87/02778
§ 371 Date: Apr. 28, 1989
§ 102(e) Date: Apr. 28, 1989

[87] PCT Pub. No.: WO88/03400
PCT Pub. Date: May 19, 1988

Related U.S. Application Data

[63] Continuation-in-part of Ser. No. 927,273, Nov. 4, 1986, Pat. No. 4,906,906.

[30] Foreign Application Priority Data

Nov. 3, 1987 [NZ] New Zealand .................. 222430
Nov. 3, 1987 [ES] Spain .................... 8703138
Nov. 4, 1987 [MX] Mexico ........................ 9140

[51] Int. Cl.$^5$ ............................................. H02P 3/08
[52] U.S. Cl. .................................... 318/269; 318/139; 318/375
[58] Field of Search .................... 318/53, 54, 55, 56, 318/57, 59, 60, 63, 65, 66, 68, 256, 257, 258, 261, 268, 269, 273, 280, 432, 433, 434, 456, 599, 375, 376

[56] References Cited

U.S. PATENT DOCUMENTS

| | | | |
|---|---|---|---|
| 3,260,912 | 7/1966 | Gregory | 318/341 |
| 3,582,747 | 6/1971 | Kearns | 318/443 x |
| 3,934,181 | 1/1976 | Rosenthal | 318/53 |
| 4,323,829 | 4/1982 | Witney et al. | 318/55 |
| 4,361,788 | 11/1982 | Melocik | 318/83 |
| 4,415,049 | 11/1983 | Wereb | 318/269 X |
| 4,500,818 | 2/1985 | Konrad et al. | 318/52 |
| 4,511,825 | 4/1985 | Klimo | 318/67 |
| 4,604,557 | 8/1986 | Cowles | 318/98 |
| 4,667,136 | 5/1987 | Bell | 318/51 |

FOREIGN PATENT DOCUMENTS 1396416 6/1975 United Kingdom .
1571791 7/1980 United Kingdom .
2081533 2/1982 United Kingdom .

*Primary Examiner*—Bentsu Ro
*Attorney, Agent, or Firm*—Wendell E. Miller

[57] ABSTRACT

A conveyance (360) is provided with: dynamic braking of electric propulsion motors (26a and 26b) that is achieved by shorting a motor winding (150a) during a portion (233a) of an interval (217a) between pulses (207a) of a pulse-width modulated driving voltage (209a); automatic limiting (233) of the rate of change in power supplied to left (26a or 232a) and right (26b) propulsion motors, whether electrically or hydraulically propelled; power-off braking that is achieved by shorting a motor winding (150a) when power pulses are not being supplied; extended life of relays (144a and 148a) that is achieved by preventing current flow to the motors during opening and closing of the relay contacts (154a and 156a); and a solid-state switching device (168a and 170a) that is controlled by a signal in a single conductor (200a) and that provides an effective delay (219a and 221a) in switching between two circuits (152a and 160a).

23 Claims, 8 Drawing Sheets

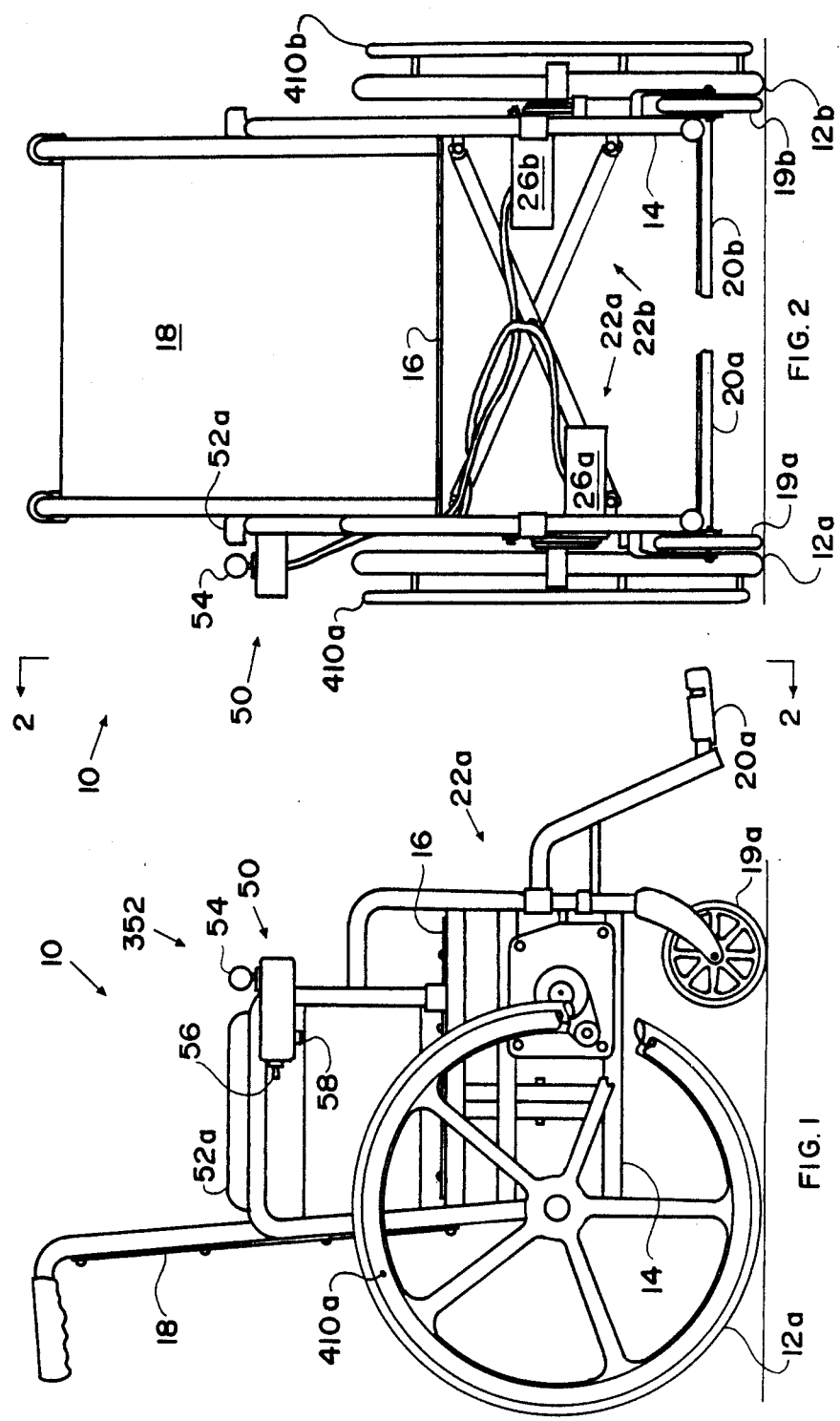

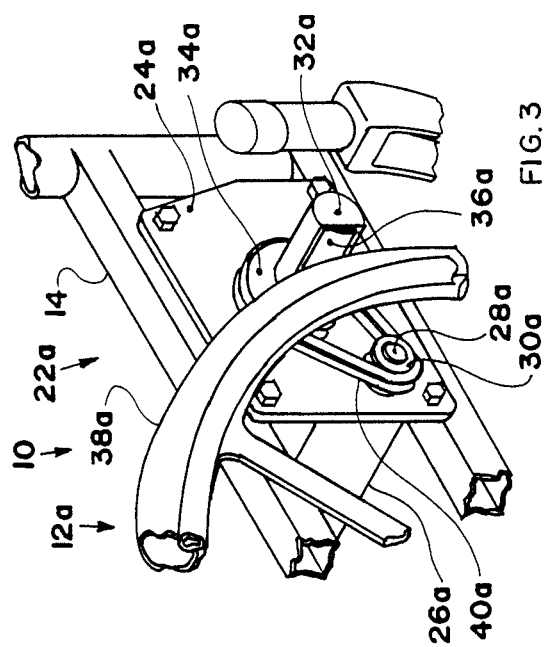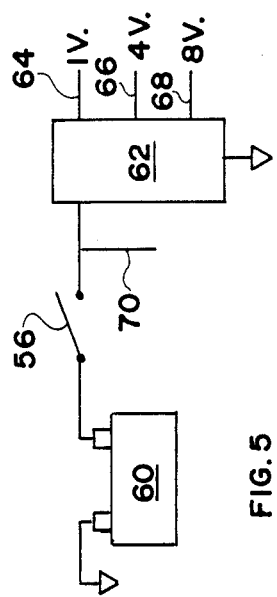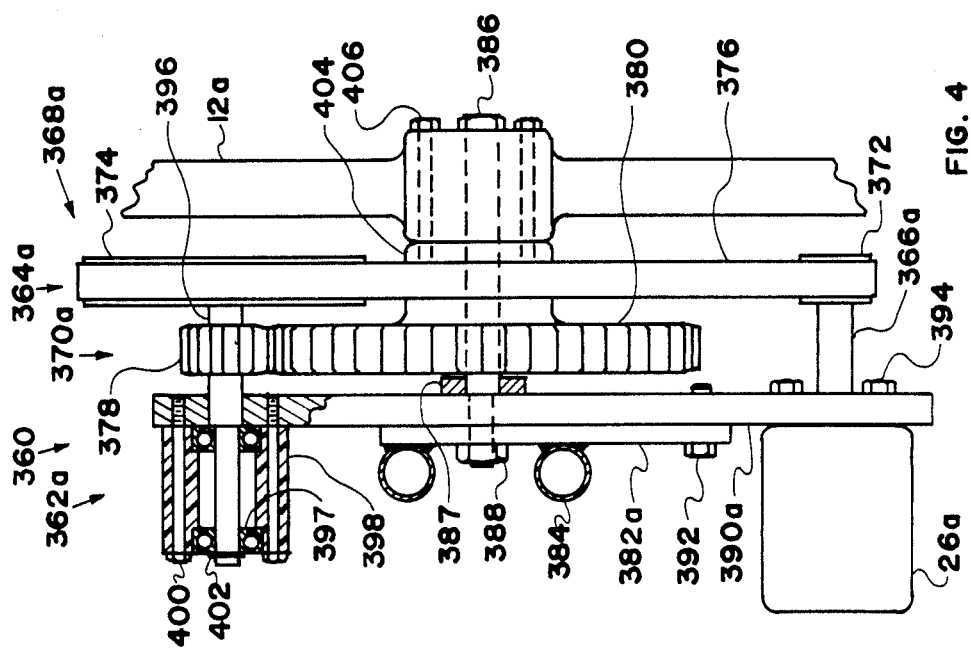

CONVEYANCE WITH ELECTRONIC CONTROL FOR MOTORS

This Patent Application corresponds to International Application Number PCT/US87/02778 filed Oct. 29, 1987, and is a continuation-in-part of U.S. patent application Ser. No. 06/927,273, filed Nov. 4, 1986, now U.S. Pat. No. 4,906,906.

BACKGROUND OF THE INVENTION

1. Technical Field

The present invention relates to controls for electric or fluid actuators, and to conveyances propelled by electric or fluid actuators. More particularly, the present invention relates to dynamically braking conveyances, and to controlling the turns of conveyances that are steered by separately controlling the speeds of the wheels.

2. Description of the Related Art

Conveyances of various types, for transporting people, for material handling, and for propelling self-propelled machinery, have requirements for extremely high maneuverability.

One way to obtain extremely high maneuverability is to separately and variably control the speed and direction of rotation of left and right wheels or other propulsion elements. When the wheels are moving at the same speed, but in opposite directions, the conveyance pivots in a fixed location, giving the ultimate in maneuverability.

A propulsion system using electric or hydraulic motors can provide flexibility of control, but precision of control has been lacking in prior art designs.

Further, achieving high maneuverability by separately controlling the velocity and direction of rotation of the wheels, or other traction elements, may make a conveyance difficult to control, or even dangerous.

For instance, it may be desirable to have the ability to make pivot turns with some conveyances, but it might be dangerous to attempt to make a pivotal turn at full speed.

But, if the rate of change of speed of the individual wheels is limited, then the machine may be sluggish in acceleration, and may be dangerously slow in deceleration.

The problem of controllability is particularly acute in wheelchairs, and the discussion that follows centers on electrically propelled wheelchairs.

Typically, separate D.C. electric motors have been connected to left and right wheels of a wheelchair by chains or belts, and by friction rollers that have separately engaged the rubber tires of the wheels.

D.C. motors provide both directions of rotation by changing polarity of the driving voltage, and produce rotational speeds that are dependent upon both the driving voltage and the torque required of them.

Manually actuated controls have been used that separately and variably supply electric power from a battery to left and right motors to make changes in speed, and to make turns, including pivot turns.

One popular type of manual control includes a control lever that is moved forward in accordance with a desired speed forward, that is moved rearward in accordance with a desired speed in reverse, that is moved both forward and to one side to make a turn while moving forward, and that is moved directly to one side to make a pivot turn.

One problem with prior art designs is that control of speed and direction has been uncertain because of the lack of dynamic braking. For instance, when the control lever has been positioned to make a left turn by reducing the electrical power to the left motor, inertia of the wheelchair and occupant has driven the left motor through the drive train that connects the left motor to the left wheel, and the wheelchair has not turned at the desired radius.

A second problem is that it has been necessary to engage and disengage the mechanical drive that connects the motors to their respective wheels, in order to manually propel electric wheelchairs. This has increased design complexity and manufacturing costs.

Commonly a driving connection between the motors and the wheels has been accomplished by using drive rollers that engage the tires. Engagement and disengagement of this driving connection has been accomplished by movement of the motors and mechanical drives, and by resultant movement of the drive rollers into, and away from, engagement with the tires, or by belt tighteners.

A third problem is that disengagement of the mechanical drive has left the wheelchair in a dangerous runaway condition in situations where someone has inadvertently forgotten to set the parking brake. That is, prior art designs have provided neither an automatic parking brake nor an automatic dynamic brake that would restrain the wheelchair from dangerous runaway conditions.

A fourth problem is that when a person with severe hand tremors has tried to control the positioning of the control lever, his hand tremors have moved the control lever rapidly from one side to the other, giving signals for first one and then the other motor to rotate faster, resulting in rapid, and even dangerous, turns in one direction and then the other.

A fifth problem has been a relatively poor overall efficiency of the drive trains that connect the electric motors to respective ones of the wheels, so that an unnecessarily large and heavy battery has been required.

A sixth problem is that prior art designs have been heavy and unwieldy to transport. This has drastically reduced the mobility of handicapped persons, limiting employment possibilities or limiting their opportunities to visit away from their homes or care facilities.

However, if prior art designs of electrically propelled wheelchairs had used drive trains with better efficiencies, then the ability of the wheels to drive the motors through the more efficient drive trains would have provided less dynamic braking, and controllability on turns would have been even poorer.

A seventh problem has been poor contact life in the relays that are used to reverse the potentials of the electric motors. This has resulted in frequent repairs and frequent periods of the wheelchair being out of service.

There are thousands of incapacitated people who would be able to gain a greater degree of self reliance, and some would be able to become a part of the work force of their country, if they were able to control some type of self-propelled conveyance.

Thus, the present invention can help handicapped people to gain a better sense of dignity and self-worth, and can help many of them become productive members of society.

3. Disclosure of Invention

The present invention provides a wheelchair, or conveyance, in which a left propulsion motor is continuously connected to a left propulsion element, or wheel, by a first power transmission; and a right propulsion motor is continuously connected to a right propulsion element, or wheel, by a second power transmission.

Electrical power to the motors is separately and variably controlled in response to a manually-positioned control, similar to the type used with computer games.

The control lever is oriented with relation to the conveyance so that moving the control lever forward results in maximum power in the forward direction being delivered to both the left and right motors.

In like manner, maximum power in the rearward direction is delivered to both motors when the control lever is moved directly rearward, power is delivered to the left and right motors in opposite directions and pivotal turns are achieved when the control lever is moved directly to one side or the other, and various percentages of power in forward and reverse directions are provided when the control lever is positioned in various directions, and at various distances from the neutral position.

Manual positioning of the control lever separately and variably actuates the wiper arms of left-propulsion and right-propulsion potentiometers. Each of the potentiometers provides two variable resistances, one from the arm to one leg thereof, and another from the arm to the other leg thereof.

The following description will describe operation for only one of the motor drives, since both sides function the same, and both clarity and brevity are best achieved in this manner.

The right-propulsion potentiometer cooperates with a signal supply voltage of eight volts that is applied across its legs and functions as a voltage divider to provide a right-propulsion signal.

The right-propulsion signal is supplied as the input to two operational amplifiers. When the right-propulsion signal is more than four volts, one of the operational amplifiers provides a forward-rotation signal for controlling the right propulsion motor; and when the right-propulsion signal is less than four volts, the other of the operational amplifiers provides a reverse-rotation signal for controlling the same propulsion motor.

A forward-propulsion comparator receives the forward-rotation signal and cooperates with a first power transistor to actuate a forward-polarity relay. In like manner, a reverse-propulsion comparator receives the reverse-propulsion signal and cooperates with a second power transistor to actuate a reverse-polarity relay. The forward-polarity and reverse-polarity relays control the polarity of the driving voltage that is supplied to the right-propulsion motor.

But, the actual supplying of electrical power, and the varying of the electrical power that is supplied, is controlled by separate means which functions as follows.

The system uses two diodes to receive the forward-rotation signal and the reverse-rotation signal, and to develop a power-control signal. The power-control signal varies from zero to four volts when an attenuation control is adjusted to allow maximum speed and power; and the power-control signal is attenuated to lower maximum voltages when lower maximum acceleration, speed, and power are desired.

A sawtooth generator and the power control signal cooperate with a comparator to develop a pulse-width-modulated control signal whose pulse-width-modulated are proportional to the magnitude of the power-control signal.

The same sawtooth generator also cooperates with a comparator in the left-propulsion circuitry to develop a pulse-width-modulated control circuit that cooperates with other components for driving the left-propulsion motor.

The pulse-width-modulated control signal cooperates with a transistor to provide a pulse and brake signal. The pulse and brake signal is pulse-width-modulated as is the pulse-width-control signal, but is amplified in power.

The pulse and brake signal controls two field-effect transistors. The first field-effect transistor receives the pulse and brake signal and pulses a connection to ground, so that the supply voltage is pulsed to the right-propulsion motor, thereby supplying a pulse-width-modulated driving voltage to the right propulsion motor. The width of the pulses determines the effective driving voltage.

It should be remembered that the polarity of the supply voltage that is applied to the right propulsion motor has been determined by the forward-rotation and reverse-rotation relays, and the first field-effect transistor determines the width of the pulses of the supply voltage that are applied to the right propulsion motor.

The second field-effect transistor cooperates with the pulse and brake signal to short the motor winding of the right propulsion motor during at least a portion of the intervals that separate the voltage pulses of the pulse-width-modulated driving voltage.

This shorting of the motor windings during a portion of the intervals between pulses of driving voltage causes the right propulsion motor to operate as an electrically loaded generator, and to provide dynamic braking.

However, if the motor winding were shorted for even a small portion of the time when pulses of the driving voltage were being applied to the motor winding, severe damage would be done to the circuit components. Thus, a delay circuit is provided that prevents this occurrence.

The delay circuit includes diodes, resistors, and the parasitic capacitance of the field-effect transistors, and provides a time-interval between the end of one pulse of the pulse-width-modulated driving voltage and shorting of the motor winding.

The delay circuit also provides a time-interval between the cessation of shorting the motor winding and the start of the next pulse of the effective driving voltage.

The present invention includes a differential-limiting circuit for limiting the rate of change in the difference of power that is delivered to the left-propulsion and right-propulsion motors, while leaving the change in the rates of power that can be delivered substantially unaffected when the rates of change of power to both motors are generally equal.

In the preferred configuration, a capacitor, which is connected across the arms of the two potentiometers, limits the rate of change in the control voltages that are provided by the two potentiometers. However, when the control lever is positioned to equally increase or decrease the power to both motors, the voltages of the right and left propulsion signals change equally and the capacitor does not see a difference in differential voltage. Thus, the differential limiting circuit does not affect acceleration or deceleration when changes in electrical power are substantially equal to both propulsion motors.

Limiting the rate of the difference in power delivered to the two motors provides a conveyance that can be controlled by people having severe hand tremors; because spurious signals produced by hand tremoring are time-averaged.

In addition to dynamic braking and differential change limiting, the present invention provides extended relay life, and provides dynamic braking when no pulses of power are being supplied to the motor.

The field-effect transistors cooperate with the relays to pulse the power after the relays are closed, and to cease delivering power before the relays open, thereby avoiding arcing across the relay contacts, and thereby resulting in greatly extended service life for the relays.

In their unenergized state, the relays short the motor winding, thereby achieving power-off dynamic braking even when the battery is removed from the conveyance.

In summary, the present invention provides a conveyance, a motor drive, and a control, in which: the power transmissions continuously connect the motors to the wheels, thereby obviating the necessity of mechanisms to connect and disconnect the power trains; dynamic braking is provided by shorting the motor winding during a portion of the intervals between power pulses, thereby providing superior control for turns and down-grade operation; differential control limiting provides ease and accuracy of control, even for those with severe hand tremors, by limiting the rate of change in the difference of power that can be supplied to one motor with respect to the other motor; and power-off dynamic braking is achieved by shorting the motor winding when no power pulses are being supplied to the motors.

In one embodiment, the present invention provides extended relay life for reversible electric motors by preventing relay contacts from making or breaking contact under load.

In another embodiment, the present invention provides a solid-state switching device in which two electrical connections are alternately made and broken in response to the change in potential in a single conductor, and a delay is provided between the breaking of the one connection and the establishing of the other connection.

Differential control limiting is applicable to both electric and fluid motors; dynamic braking is applicable to any electric motor that is driven by voltage pulses whether width-modulated, amplitude-modulated, or unmodulated; power-off dynamic braking is applicable to various uses, particularly with permanent magnet motors; the circuitry for increasing relay life is particularly applicable to reversible electric motors that are driven by pulsed driving voltages; and the solid-state switching device is applicable to various uses, including reversible electric motors.

According to a first aspect of the invention, there is provided a motor drive having an electric motor, and having a motor control that supplies pulses of a driving voltage to motor. A motor-loading device supplies a plurality of electric motor-loading pulses to the motor, thereby providing dynamic braking for the motor drive.

According to a second aspect of the invention, there is provided a method for providing an electric motor drive with dynamic braking. The method includes: supplying pulses of electrical power to the motor that include intervals therebetween; and placing an electrical load on the motor during a portion of a plurality of the intervals.

According to a third aspect of the invention, there is provided a conveyance of the type having a drive unit that includes an electric motor, and that includes a power transmission that connects the motor to a propulsion element. The improvement includes a motor control that supplies pulses of a driving voltage to the motor; and a motor-loading device that supplies a plurality of electrical motor-loading pulses to the motor, thereby providing dynamic braking for the propulsion element.

According to a fourth aspect of the invention, there is provided a method for dynamically braking a conveyance, which method comprises: drivingly connecting a motor to a propulsion element; supplying pulses of electrical power to the motor that include intervals therebetween; and electrically loading the motor during a portion of a plurality of the intervals.

According to a fifth aspect of the invention, there is provided a motor drive having first and second motors; a motor control that separately and variably supplies power to the first and second motors; a manual control that selectively and variably controls the motor control and the separate and variable supplying of power; and a change limiter that limits the rate of change in differences in power supplied to the first and second motors, and that permits relatively unrestricted rates of change in power supplied to the motors when rates of changes in power supplied to the first and second motors are generally equal.

According to a sixth aspect of the invention, there is provided an electric motor drive of the type having an electric motor that includes a motor winding with first and second ends. A motor control supplies electrical power to the first and second ends of the motor winding, and removes power from the electric motor; and a motor-loading device interconnects the first and second ends of the motor winding when the power is removed from said ends of the motor winding, thereby causing the electric motor to function as an electrically loaded generator; whereby the electric motor provides dynamic braking during power-off conditions.

According to a seventh aspect of the invention, there is provided a reversible electric motor drive of the type having an electric motor, and having a relay that includes electrical contacts for determining the direction of rotation of the electric motor. The improvement comprises: circuitry that closes the electrical contacts of the relay before supplying power to the motor, and that opens the electrical contacts after removing power from the motor, so that arcing between the electrical contacts is obviated and the service life of the contacts is extended.

According to an eighth aspect of the invention, there is provided a solid-state switching device that alternately makes and breaks first and second electrical contacts in response to a change in potential in a single conductor, and that provides a delay between breaking of one of the electrical contacts and making of the other electrical contact, thereby obviating the possibility of instantaneous shorting the solidstate components during switching operations.

BRIEF DESCRIPTION OF DRAWINGS

FIG. 1 is a side elevation of a conventional wheelchair to which the electric motor drive of the present invention has been added;

FIG. 2 is a front elevation of the electric wheelchair of FIG. 1, taken substantially as shown by view line 2—2 of FIG. 1;

FIG. 3 is a perspective view of the drive unit of the electric wheelchair of FIG. 1, taken at a perspective angle that is both upward and rearward from that of FIG. 1, and showing a first embodiment of a power transmission;

FIG. 4 is a top view of a second and preferred embodiment of a power transmission for use with the present invention, showing some components in cross-section;

FIG. 5 is a schematic drawing of the source of electrical power, and the regulated voltages, for the systems of FIGS. 9 and 10;

BEST MODE FOR CARRYING OUT THE INVENTION

Figure 8A:
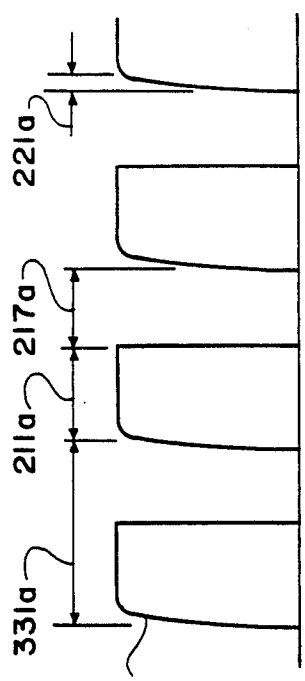
FIG. 8A illustrates the wave form of the pulse-width-modulated driving voltage and shows the effective delay at the start of each voltage pulse.
Figure 8B:
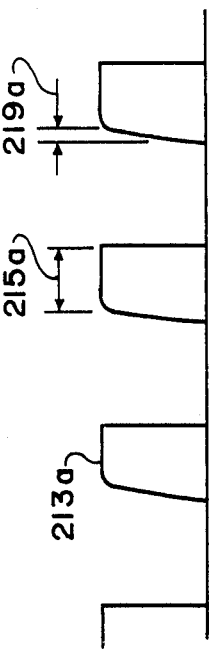
FIG. 8B illustrates the wave form of the dynamic braking pulses and shows the effective delay at the start of each pulse.
Figure 8C:
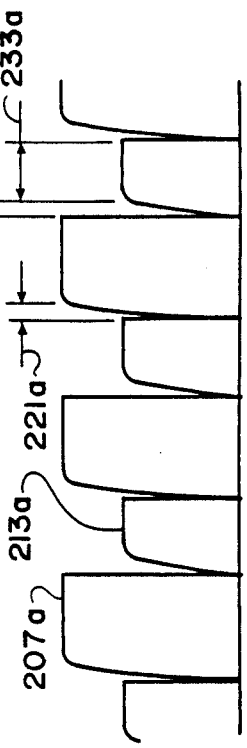
FIG. 8C shows the wave forms of FIGS. 8A and 8B superimposed.

Referring now to FIGS. 1–3, an electric wheelchair 10 includes right and left wheels, or first and second propulsion elements, 12a and 12b, a frame 14, a seat bottom 16 and a seat back 18, castor wheels 19a and 19b, and footrests 20a and 20b. The wheelchair discussed thus far is typical of the prior art.

The electric wheelchair 10 includes drive units, 22a and 22b, which are generally mirror images of one another, and which are shown and described in detail in U.S. patent application No. 06/927,273, of common inventorship entity.

The drive unit 22a includes a mounting plate 24a, a first electric motor, or right electric motor, 26a of the permanent field-magnet type which is mounted to the plate 24a and which includes a motor shaft 28a that extends through the plate 24a, a drive pulley 30a which is mounted onto the motor shaft 28a, a stationary spindle 32a which is attached to the plate 24a, a driven pulley 34a which is rotatably mounted onto the spindle 32a, a drive roller 36a which is secured to the pulley 34a and which engages a tire 38a of the wheel 12a, and belts 40a which engage the pulleys 30a and 34a.

The plate 24a is moved rearward to engage the drive roller 36a with the tire 38a for power propulsion, and is moved forward to disengage the drive roller 36a for manual propulsion. A mechanism for moving the plate 24a is shown and described in detail in U.S. patent application No. 07/025,330.

However, as will be described in conjunction with FIG. 4, in the present invention, there is no necessity for disengaging the driving connection between the motors and the wheels.

A second electric motor, or left electric motor, 26b is at a different height than the right motor 26a; so that the motors, 26a and 26b, bypass each other when the wheelchair 10 is folded with the wheels 12a and 12b proximal to one another.

The wheelchair 10 includes a control box 50 which is attached near an armrest 52a, and which includes a control lever 54, an ON-OFF switch 56, and a speed-power limiting control 58.

The control lever 54 controls two potentiometers, and the two potentiometers control rotational speeds of the motors, 26a and 26b.

Forward movement of the control lever 54 produces forward propulsion, rearward movement produces rearward movement, forward and rightward movement produces forward propulsion with a right turn, and sideward movement produces a pivot turn with the wheels, 12a and 12b, turning in opposite directions.

Referring now to FIG. 5, a twelve volt battery, or source of electrical power, 60 is connected to a voltage regulator 62 by the ON-OFF switch 56 of FIG. 1. The voltage regulator 62 provides outputs of one, four, and eight volts in 8 volt output conductors 64, 66, and 68, respectively. The switch 56 also controls supplying of twelve volts in a conductor 70.

Figure 9A:
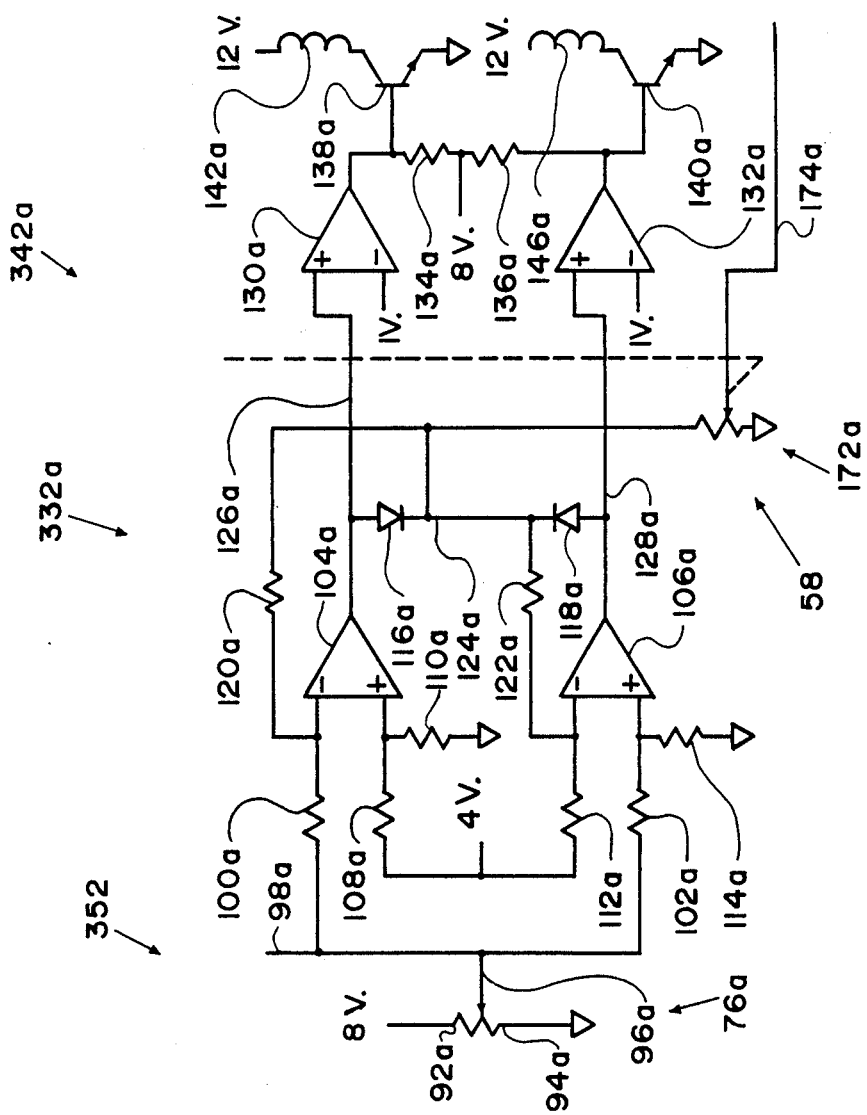
FIGS. 9A and 9B combine to provide a schematic drawing of the motor and electronics for driving the right wheel, and may be considered as combining to form FIG. 9.
Figure 9B:
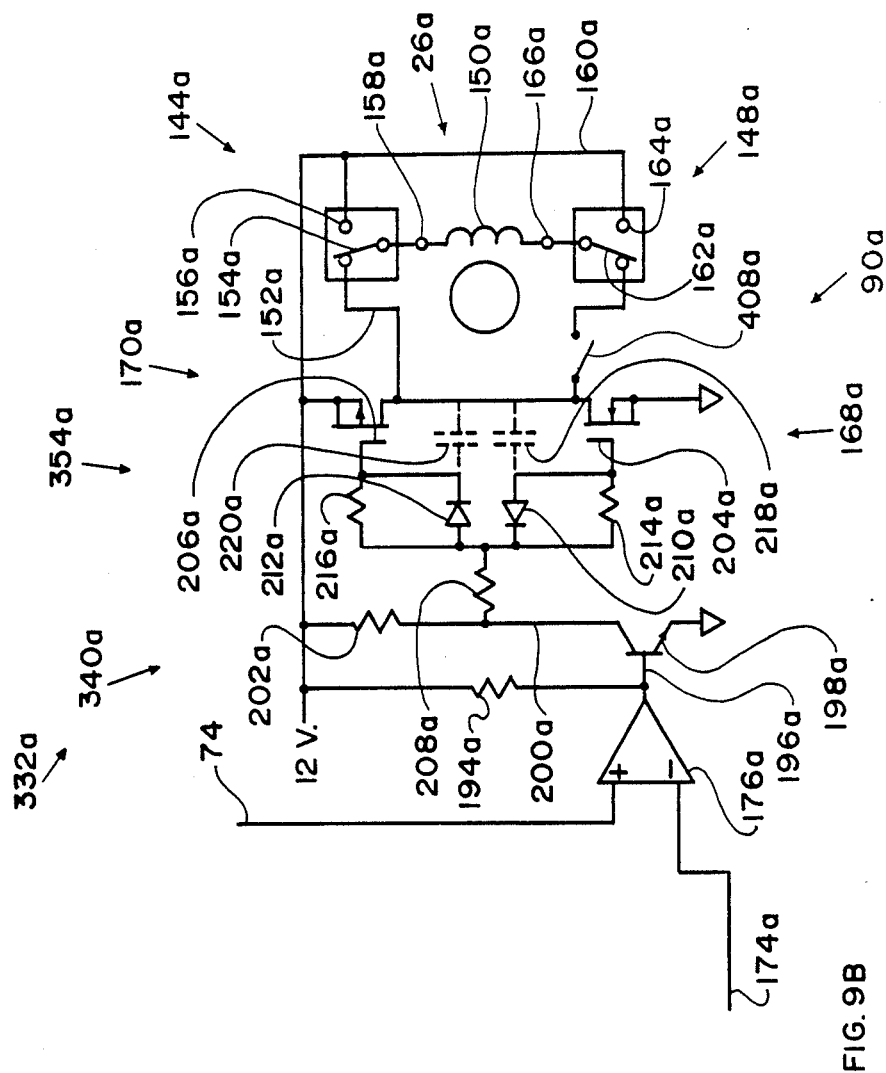
Figure 10:
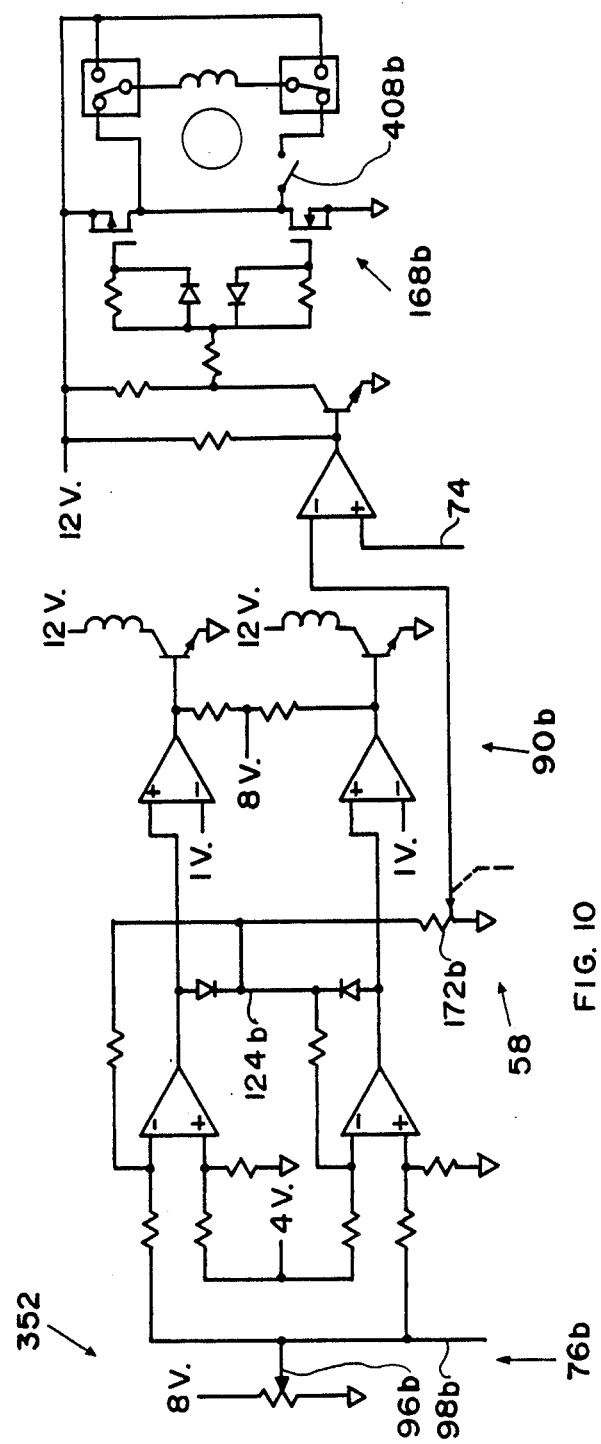
FIG. 10 is a schematic drawing of the motor and electronics for driving the left wheel.

Referring now to FIGS. 9A, 9B, and 10, FIGS. 9A and 9B combine to provide a circuitry that hereafter will be referred to as FIG. 9. The circuitry of FIG. 9 is for the right motor 26a. An identical circuit, as shown in FIG. 10, controls the left motor 26b.

Figure 6:
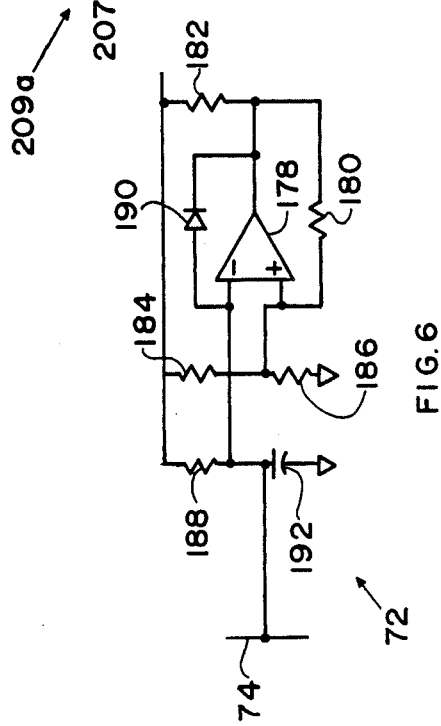
FIG. 6 is a schematic drawing of the sawtooth generator that is a part of pulse-width modulation of the driving voltages for both motors.

Operating voltages for FIGS. 9 and 10, are provided by the circuitry of FIG. 5. A sawtooth generator 72 of FIG. 6 provides a sawtooth signal in a conductor 74 for use with the circuitries of both FIGS. 9 and 10.

FIG. 9 includes a first potentiometer, or right motor potentiometer, 76a; and FIG. 10 includes a second potentiometer, or left motor potentiometer 76b.

The potentiometers, 76a and 76b, may be a part of an X-Y control that provides resistances proportional to movement of a control lever from the intersection of X and Y axes, such as are commonly used to play video games, or the potentiometers, 76a and 76b, may be controlled in any suitable manner.

Since the circuitries of FIGS. 9 and 10 are identical, only FIG. 9, which includes the circuitry which drives the right electric motor 26a, will be described.

Referring now to FIG. 9, an electric motor drive, or right wheel drive, 90a includes the potentiometer 76a. The potentiometer 76a includes an upper leg 92a that is connected to the conductor 68 of FIG. 5 and receives a potential of eight volts therefrom, a lower leg 94a that is connected to ground, as shown, and a wiper arm 96a.

Movement of the wiper arm 96a above a midpoint in the resistance of the potentiometer 76a produces a forward-rotation signal that increases from four to eight volts in a conductor 98a as the wiper arm 96a moves upwardly from the midpoint in the resistance; and movement of the wiper arm 96a below the midpoint in the resistance of the potentiometer 76a produces a reverse-rotation signal that varies from four volts down to zero as the wiper arm 96a moves downwardly from the midpoint.

The forward-rotation signal in the conductor 98a is supplied to an input resistor 100a and to an input resistor 102a. The input resistor 100a is connected to the negative input terminal of an operational amplifier 104a; and the input resistor 102a is connected to the positive input terminal of an operational amplifier 106a.

The positive input terminal of the operational amplifier 104a is connected to four volts by an input resistor 108a and to ground by a resistor 110a. The negative input terminal of the operational amplifier 106a is connected to four volts by an input resistor 112a; and the positive input terminal of the operational amplifier 106a is connected to ground by a resistor 114a.

The output of the operational amplifier 104a is a forward-rotation signal; and the output of the operational amplifier 106a is a reverse-rotation signal.

The outputs of the operational amplifiers 104a and 106a are connected together by means of diodes 116a and 118a; and feedback resistors 120a and 122a are connected to a junction 124a that is intermediate of the diodes 116a and 118a, and to respective ones of the negative input terminals of the operational amplifiers, 104a and 106a.

Continuing to refer to FIG. 9, if the feedback resistor 120a were connected directly to the output terminal of the operational amplifier 104a, rather than between the diodes, 116a and 118a, then a decrease below four volts in the conductor 98a, as produced by the wiper arm 96a moving downwardly from the midpoint of the resistance in the potentiometer 76a, would produce a voltage that would vary from zero to four volts at the output terminal of the operational amplifier 104a.

However, since the feedback resistor 120a is connected between the diodes 116a and 118a, the voltage between the diodes 116a and 118a varies from zero to four volts with movement of the wiper arm 96a from the midpoint of the potentiometer 76a downwardly toward zero volts; and the voltage at the output terminal of the operational amplifier 104a is higher by the voltage drop across the diode 116a, which is approximately six-tenths of a volt.

In like manner, with an increase in voltage in the conductor 98a from four volts to eight volts, as the wiper arm 96a is moved upwardly toward eight volts, the operational amplifier 106a produces a voltage that increases from zero to four volts at the junction 124a, and that is approximately six-tenths of a volt higher at the output of the operational amplifier 106a.

The operational amplifiers 104a and 106a cooperate with the diodes 116a and 118a to form an absolute value circuit. That is, whether the wiper arm 96a of the potentiometer 76a moves upwardly above the midpoint of the resistance thereof, or moves downwardly below the midpoint of the resistance thereof, a power-control signal is produced at the junction 124a which increases as a function of the wiper arm 96a of the potentiometer 76a moving away from the midpoint of the resistance thereof. The use of this power-control signal will be described subsequently.

The circuitry described thus far produces three control signals: the operational amplifier 104a produces a forward-rotation signal in a conductor 126a; the operational amplifier 106a produces a reverse-rotation signal in a conductor 128a; and the diodes 116a and 118a cooperate with the forward-rotation signal in the conductor 126a and with the reverse-rotation signal of the conductor 128a to provide the power-control signal at the junction 124a.

The forward-rotation signal is supplied to the positive input terminal of a comparator 130a; and the reverse-rotation signal is supplied to the positive input terminal of a comparator 132a. Both of the comparators, 130a and 132a, are connected to the one volt source of FIG. 5; so that both comparators, 130a and 132a, have a threshold of approximately one volt.

Continuing to refer to FIG. 9, since the outputs of the operational amplifiers, 104a and 106a have outputs that are approximately zero volts when the wiper arm 96a is at the midpoint of the resistance of the potentiometer 76a, neither will have sufficient voltage to produce an output from the respective one of the comparators, 130a or 132a.

When the signal voltage in the conductor 98a is a few tenths of a volt below the four volt input to the positive input resistors of the operational amplifier 104a, the output of the operational amplifier 104a will exceed the one volt threshold of the comparator 130a; and when the signal voltage in the conductor 98a is a few tenths of a volt above the four volt input to the negative input resistors of the operational amplifier 106a, the output of the operational amplifier 106a will exceed the one volt threshold of the comparator 132a.

Thus, it is theoretically impossible for the comparators, 130a and 132a, to produce outputs signalling both forward and reverse rotation of the electric motor 26a for any position of the wiper arm 96a. Instead, the wiper arm 96a must be offset four-tenths of a volt on either side of the four volt mid-point to produce a signal that initiates rotation of the electric motor 26a in either the forward or reverse direction.

The output terminals of the comparators 130a and 132a are connected to the eight volt conductor 68 of FIG. 5 by pull-up resistors 134a and 136a respectively, and to forward-power transistor 138a and reverse-power transistor 140a, respectively.

The forward-power transistor 138a is connected to ground, and to twelve volts through a relay coil 142a of a forward-power relay, or mechanical relay, 144a; and the reverse-power transistor 140a is connected to ground, and to twelve volts through a relay coil 146a of a reverse-power relay 148a.

The right electric motor 26a includes a motor winding 150a which is connected to the relays, 144a and 148a, as shown; and the relays, 144a and 148a, are in their unenergized positions, as shown; so that the motor winding 150a is shorted by the relays, 144a and 148a, and by conductors 152a.

Thus, when neither of the relay coils, 142a or 146a, is energized, the system shorts the motor winding 150a, thereby causing the electric motor 26a to function as an electrically loaded generator, and thereby providing dynamic braking.

This condition of dynamic braking occurs in three different modes. It occurs when the manually selected position of the control lever 54 of FIGS. 1 and 2 is such that neither relay coil, 142a or 146a, is energized; it occurs when the switch 56 of FIG. 5 is in the OFF position, as shown; and it occurs when the battery 60 is removed from the circuit.

Thus, the system provides power-off dynamic braking as well as providing dynamic braking during power-on conditions.

When the comparator 130a provides an output, the transistor 138a energizes the relay coil 142a, and a relay contactor 154a is moved to a contact 156a, thereby connecting an end 158a of the motor winding 150a to a twelve volt conductor 160a.

In like manner, when the relay coil 146a is energized, a relay contactor 162a is moved to a contact 164a, connecting an end 166a of the motor winding 150a to the twelve volt conductor 160a.

Thus the relays 144a and 148a function to determine which of the ends, 158a or 166a, of the motor winding 150a is connected to the twelve volt conductor 160a, function to determine the polarity of the power being supplied to the electric motor 26a, and thereby determine the direction of rotation of the electric motor 26a.

However, completion of the circuitry to supply power to the electric motor 26a is dependent upon a field-effect transistor, or FET 168a. The functioning of the field-effect transistor 168a, and another field-effect transistor, or FET, 170a, will be described subsequently.

Continuing to refer to FIG. 9, it was shown previously that a power-control signal is developed at the junction 124a, whereas direction-control signals are developed in the conductors 126a and 128a.

The power control signal of junction 124a is connected to a potentiometer 172a which is mechanically connected to a potentiometer 172b of FIG. 10. The potentiometers 172a and 172b serve to attenuate the power-control signals of the junctions 124a of FIG. 9 and 124b of FIG. 10, and thus to provide the speed-power limiting control 58 of FIG. 1, which adjustably limits the maximum-power supplied to the electric motors 26a and 26b.

The attenuated power-control signal in a conductor 174a is supplied to the negative terminal of a comparator 176a; and the positive terminal of the comparator 176a is connected to the sawtooth generator 72 by the conductor 74.

Referring now to FIG. 6, the sawtooth generator 72 includes an operational amplifier 178, resistors 180, 182, 184, 186, and 188, a diode 190, and a capacitor 192. The sawtooth generator 72 is a standard relaxation circuit and a detailed description can be found in both electronic textbooks and handbooks. Thus, it is sufficient to note that a sawtooth voltage is delivered to the conductor 74 that varies from a minimum of one volt to a maximum of three volts.

Referring again to FIG. 9, the comparator 176a, together with a pull-up resistor 194a which is connected between the output of the comparator 176a and the twelve volt conductor 160a, produces an output in a conductor 196a whenever the input to the negative terminal of the comparator 176a is greater than the sawtooth voltage which the sawtooth generator 72 supplies to the positive input terminal of the comparator 176a via the conductor 74.

The result is that a pulse-width-modulated control signal is produced in the conductor 196a whose pulse widths are a function of the magnitude of the attenuated power-control signal in the conductor 174a.

The conductor 196a is connected to a transistor 198a. The transistor 198a is connected to the twelve volt source in the conductor 160a by a conductor 200a and a pull-up resistor 202a, and is connected to ground.

The field-effect transistor 168a is an N channel enhancement mode MOSFET which turns on when its gate 204a is increased above ground potential; and the field-effect transistor 170a is a P channel enhancement mode MOSFET which turns on when its gate 206a is decreased below its source potential.

When the output of the comparator 176a is producing a voltage pulse, the gate 204a of the FET 168a is above ground potential; and the FET 168a completes the circuitry of the electric motor 26a by connecting one of the ends, 158a or 166a, of the motor winding 150a to ground.

Of course, the one of the ends, 158a or 166a, that is connected to ground by the FET 168a depends upon the positions of the relay contactors 154a and 162a of the relays 144a and 148a.

But when the comparator 176a is not producing an output in the conductor 196a, as is the condition between pulses of the pulse-width-modulated control voltage, then the voltage in the conductor 196a is approximately 0.7 volts and current flow in the pull-up resistor 202a, and the voltage drop thereof, brings the voltage on the gate 206a of the FET 170a down below the source voltage of the twelve volt conductor 160a.

With the voltage on the gate 206a below the source voltage, the FET 170a conducts, connecting the twelve volt conductor 160a to the conductors 152a. Since one of the ends, 158a or 166a, of the motor winding 150a is connected to the twelve volt conductor 160a by one of the relay contactors, 154a or 162a, the result is that both ends, 158a and 166a, of the motor winding 150a are connected to the twelve volt conductor 160a; the motor winding 150a is shorted; the electric motor 26a functions as an electrically loaded generator; and the electric motor 26a provides dynamic braking.

Referring now to FIGS. 8A, 8B, 8C, and 9, the FET 168a pulses a connection to ground so that driving-voltage pulses, or power pulses, 207a of the supply voltage are applied to the electric motor 26a that are an effective driving voltage, or pulse-width-modulated driving voltage, or voltage pulses, 209a whose pulse widths 211a are generally proportional to manual positioning of the control lever 54 and the potentiometer 76a.

The FET 170a provides dynamic braking pulses, or motor-loading pulses, 213a whose pulse widths 215a are generally equal to no-power intervals, or no-voltage intervals, 217a between adjacent ones of the power pulses 207a that are supplied by the FET 168a.

When the pulse widths 211a of the driving voltage 209a become wider, the no-power intervals 217a between pulses become smaller, and the dynamic braking is reduced; and as the pulse widths 211a of the driving voltage 209a become narrower, the no-power intervals 217a between the voltage pulses 209a become wider, and the dynamic braking is increased.

Therefore, the dynamic braking has little effect on the efficiency of the drive when the electric motor 26a is operating at, or near, maximum power. But the dynamic braking is quite effective in providing the deceleration that is needed to provide controllability, particularly the deceleration that is required to make turns with a conveyance which is propelled by two electric motors that separately and variably control left and right wheels.

Continuing to refer to FIG. 9, it has been shown that both the FET 168a and the FET 170a are controlled by the voltage in the conductor 196a. Remember that the FET 168a applies power to the electric motor 26a, and the FET 170a shorts the motor winding 150a; so it is apparent that the FETS, 168a and 170a, control functions that must not occur at the same time.

The present invention includes means for providing an effective delay 219a in starting each braking pulse 213a subsequent to the end of respective ones of the power pulses 207a.

Also, the present invention includes means for providing an effective delay 221a in starting each power pulse 207a subsequent to the end of respective ones of the braking pulses 213a.

The means for providing the effective delays, 219a and 221a, include a coupling resistor 208a, diodes 210a and 212a, time-delay resistors 214a and 216a, and parasitic capacitors, 218a and 220a, of the FETS, 168a and 170a, which are indicated by dash-lines.

The output of the transistor 198a is delivered to the gate 204a of the FET 168a by means of the coupling resistor 208a and the time-delay resistor 214a. Now any transistor that has appreciable current-carrying capacity has some parasitic capacitance, as indicated by the parasitic capacitors 218a and 220a. So, an increase in voltage at the gate 204a, in response to an increase in voltage in the conductor 200a at the output of the transistor 198a, is delayed by current flowing through the time-delay resistor 214a to charge the parasitic capacitor 218a.

However, when the voltage falls at the output of the transistor 198a, the parasitic capacitor 218a is discharged rapidly through the diode 210a which bypasses the time-delay resistor 214a.

Thus, the time-delay resistor 214a, the parasitic capacitor 218a and the diode 210a cooperate to provide the effective delay 221a in the start of a pulse 207a of driving voltage 209a; and these same elements cooperate to promptly shut off the FET 168a.

In like manner, the output of the transistor 198a is delivered to the gate 206a of the FET 170a by means of the coupling resistor 208a and the time-delay resistor 216a.

When the output of the transistor 198a decreases, a decrease in the voltage at the gate 206a, below the supply voltage in the conductor 160a, is delayed by current flowing through the time-delay resistor 216a as the parasitic capacitor 220a of the FET 170a discharges.

However, when the voltage increases at the output of the transistor 198a, the parasitic capacitor 220a is charged rapidly through the diode 212a which bypasses the time-delay resistor 216a.

Thus, the time-delay resistor 216a, the parasitic capacitor 220a, and the diode 212a cooperate to delay a decrease in voltage on the gate 206a, and to provide the effective delay 219a in each dynamic braking pulse 213a subsequent to cessation of a power pulse 207a; and these same elements cooperate to promptly increase the voltage on the gate 206a, and promptly shut off the FET 170a.

So, means is provided for effectively delaying the start of shorting the motor winding 150a, and for delaying the start of the next power pulse 207a, thereby preventing the motor winding 150a from being shorted during the time that a pulse 207a of the driving voltage 209a is being supplied to the motor winding 150a.

Figure 7:
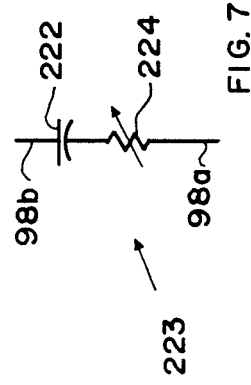
FIG. 7 shows the circuitry that limits the difference in change in power that is supplied to the left and right propulsion motors.

Referring now to FIGS. 7, 9, and 10, the wiper arms 96a and 96b of the potentiometers 76a and 76b are connected together by the conductors 98a and 98b, a time-averaging capacitor 222, and a variable resistor 224.

When the control lever 54 is positioned to make a sudden change in the position of one of the wiper arms, 96a or 96b, with respect to former positions of the wiper arms, 96a and 96b, the capacitor 222 delays the change in voltage in the conductor 98a or 98b that is connected to the one of the wiper arms, 96a or 96b, that has been repositioned abruptly.

Thus, the capacitor 222 time-averages changes in the differences of the signal supply voltages that are being supplied by the potentiometers 76a and 76b; and the capacitor 222 functions as a change limiting means 223 for limiting the rate of change in the difference in power that can be supplied to one motor, 26a or 26b, with respect to the other motor 26b or 26a.

The variable resistor 224 is an optional part of the change limiting means 223; but can be used to provide a means for selectivety varying the rate of change in the difference in power that can be supplied to one motor, 26a or 26b, with respect to the other motor, 26b or 26a. While it would be possible to vary the conductance, as represented by the capacitor 222, particularly by switching various capacitors in between the conductors, 98a and 98b, the variable resistor 224 provides a means for infinitely varying the limiting of the rate of change in the signal supply voltages.

Figure 11:
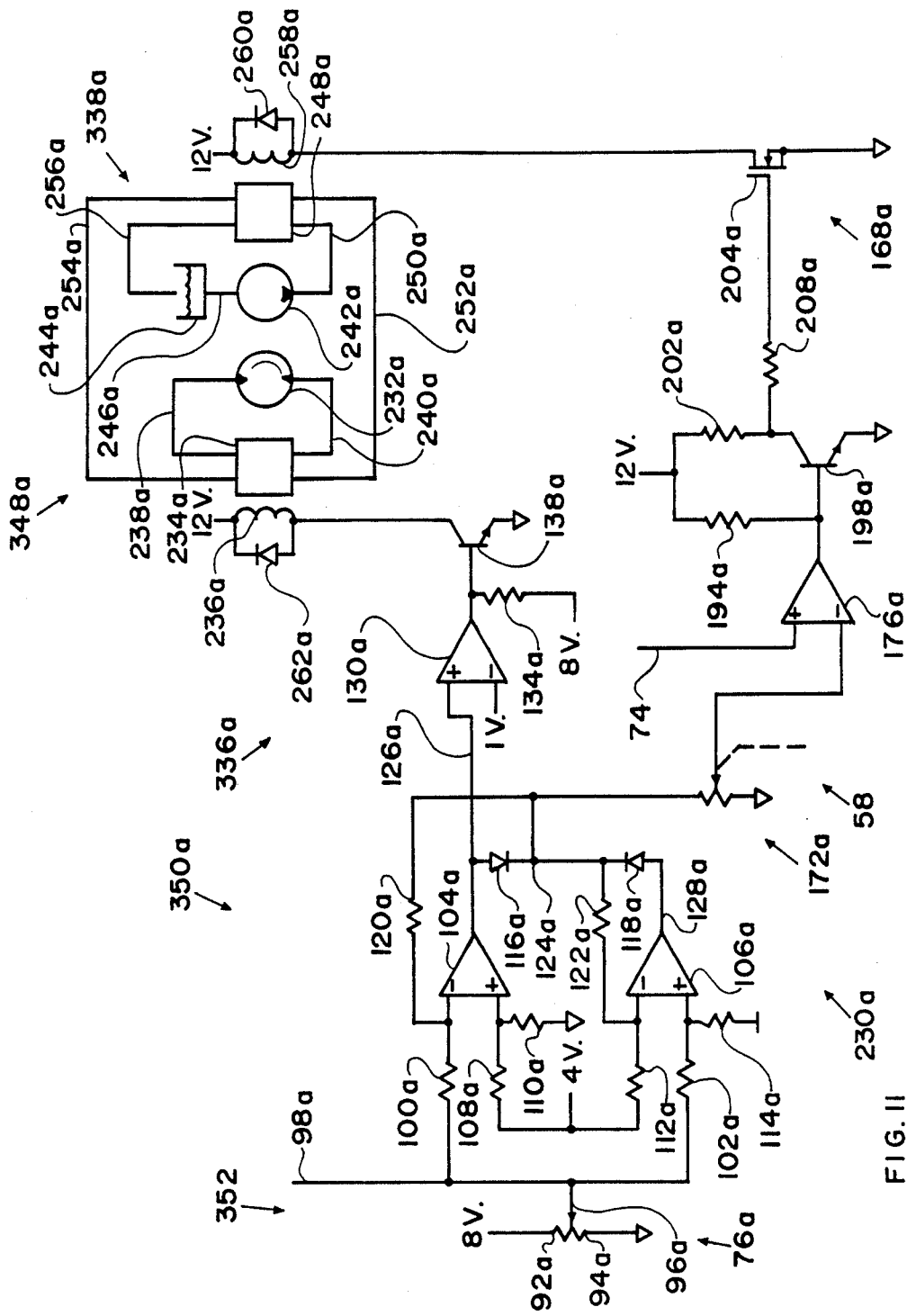
FIG. 11 is a schematic diagram showing a variation of the embodiment of FIGS. 6–9 in which the electronic control and the differential control, limiting thereof, is used to control hydraulic motors.

Referring now to FIG. 11, a fluid motor drive 230a is similar to the electric motor drive 90a of FIG. 9, is used to control a reversible fluid motor 232a, and achieves limiting of the rate of change in the difference in the speed of the fluid motor 232a, and a similar fluid motor, not shown, similar to that which has been described for the electric motors 26a and 26b.

The fluid motor drive 230a is used in cooperation with another fluid motor drive, not shown. Both of the fluid motor drives, 230a and the other fluid motor drive, are used with the sawtooth generator 72 of FIG. 6, are connected thereto by the conductor 74, and cooperate with the sawtooth generator to separately provide, and to separately utilize, pulse-width-modulated control voltages.

In like manner, the fluid motor drives, 230a, and a similar fluid motor drive that is not shown, are connected together by the change limiting means 223 of FIG. 7.

The fluid motor drive 230a includes a directional control valve 234a with a solenoid coil 236a, the fluid motor 232a which is connected to the directional control valve 234a by motor conduits 238a and 240a, a fluid pump 242a which is connected to a fluid reservoir 244a by an inlet conduit 246a and to a proportional output valve 248a by an outlet conduit 250a.

The fluid pump 242a and the fluid reservoir 244a provide a source of fluid power, the fluid power is delivered to the proportional output valve 248a by the outlet conduit 250a, the proportional output valve 248a delivers pressurized fluid to the directional control valve 234a by a supply conduit 252a, the directional control valve 234a delivers the pressurized fluid to the fluid motor 232a through one of the motor conduits 238a or 240a, the fluid motor 232a returns fluid to the directional control valve 234a through the other of the motor conduits, 240a or 238a, the directional control valve 234a returns fluid to the proportional output valve 248a through a return conduit 254a, and the proportional output valve 248a returns fluid to the fluid reservoir 244a through a reservoir conduit 256a.

Positioning the potentiometer 76a produces an output from the transistor 138a as described in conjunction with FIG. 9.

The transistor 138a connects the solenoid coil 236a between twelve volts and ground whenever the potentiometer 76a is positioned to develop a voltage in the conductor 98a that is less than four volts.

The directional control valve 234a is positioned to supply pressurized fluid to one of the motor conduits, 238a or 240a, when the solenoid coil 236a is energized, and is positioned to supply pressurized fluid to the other of the motor conduits, 240a or 238a, when the solenoid coil 236a is not energized. Therefore, only one comparator, 130 a, is needed, whereas two comparators, 130a and 132a, were used with the electric motor drive 90a of FIG. 9.

The proportional output valve 248a includes a solenoid coil 258a which controls the flow rate of pressurized fluid that is delivered to the directional control valve 234a proportional to the effective driving voltage that is applied across the solenoid coil 258a. Or, alternately, the proportional output valve controls the flow of fluid coming back from the fluid motor 232a.

As described in conjunction with FIG. 9, a pulse-width-modulated control signal is developed at the output of the comparator 176a as the sawtooth output of the sawtooth generator 72 is compared with the attenuated voltage out of the potentiometer 172a. This pulse-width-modulated control signal cooperates with the FET 168a to provide a pulse-width-modulated voltage as has been described in conjunction with FIG. 9; and this pulsed voltage is applied to the solenoid coil 258a of the proportional output valve 248a to provide a fluid flow rate that is proportional to positioning of the potentiometer 76a.

The fluid motor drive 230a includes a diode 260a which is connected across the solenoid coil 258a of the proportional output valve 248a, and which prevents excessive voltages from being applied to the output of the FET 168a when the magnetic field of the solenoid coil 258a collapses. In like manner, a diode 262a is placed across the solenoid coil 236a of the directional control valve 234a to prevent excessive voltages from being applied to the output of the transistor 138a when the magnetic field of the solenoid coil 236a collapses.

The electronic circuitry of the embodiment of FIG. 11 does not include dynamic braking; so the circuitry of FIG. 9 that includes the FET 170a is not needed. Consequently, time delays between pulses of driving voltage and pulses of braking voltage are not needed. So, only one FET, 168a, is required; and the time-delay resistor 214a and the diode 210a of FIG. 9 are not needed. Thus, in FIG. 11 the coupling resistor 208a is connected directly to the gate 204a of the FET 168a.

Hydraulic circuits and components for achieving control of fluid motors, including the direction of rotation, rotational speed, and dynamic braking are common to the art; so the hydraulic circuitry of FIG. 11 is representative of one of the many ways in which the control of direction of rotation, speed of rotation, and limitation of the rate of change of two fluid motors can be achieved with the present invention.

Figure 12:
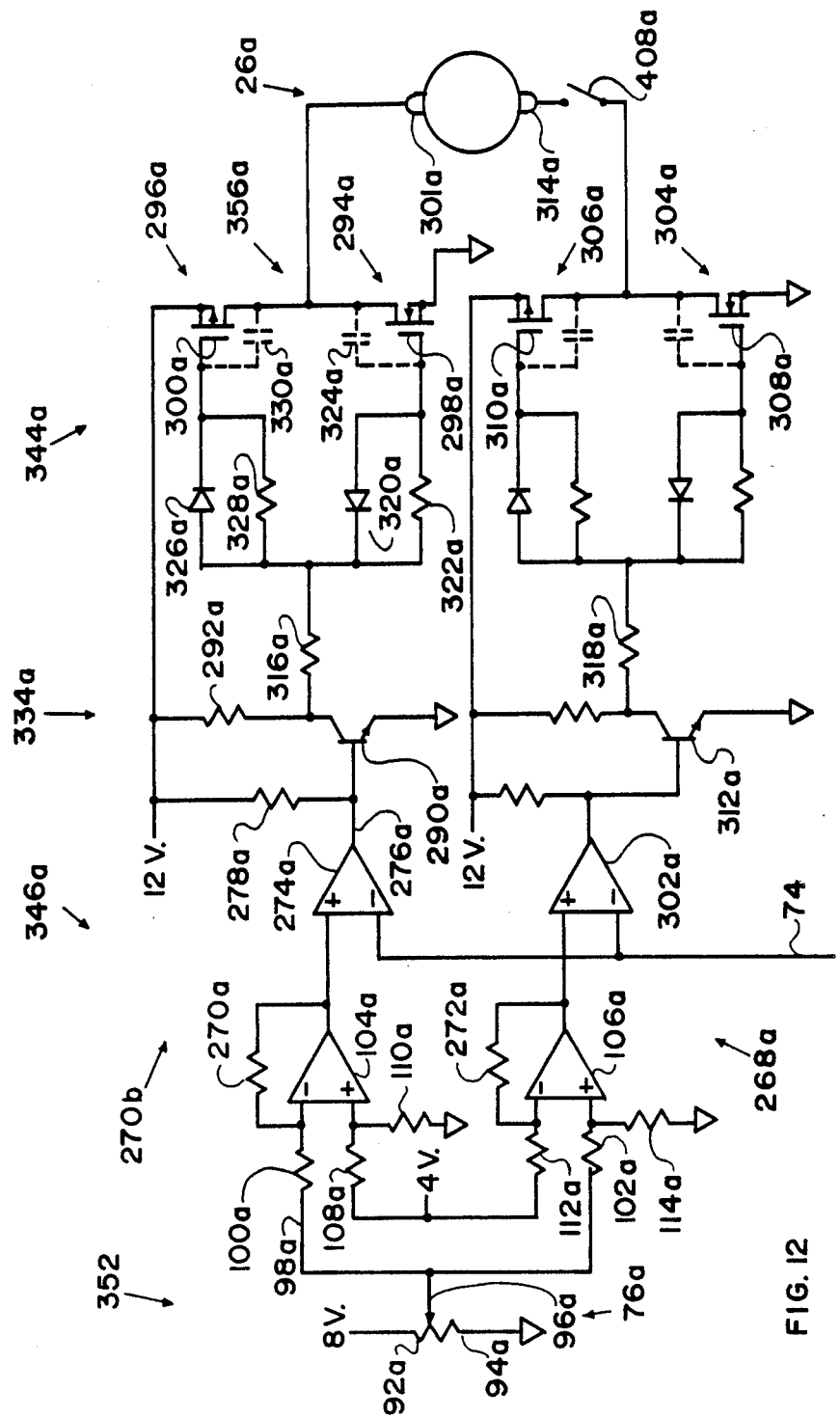
FIG. 12 is a schematic drawing of the preferred embodiment of the present invention, showing a variation of the embodiment of FIGS. 9A and 9B, wherein field-effect transistors are used to control both the polarity of the power and the application of the pulses, thereby eliminating the need for mechanical relays.

Referring now to FIG. 12, in the preferred embodiment of the present invention, an electric motor drive 268a is provided which is similar to the electric motor drive 90a of FIG. 9, but which has the advantage of eliminating the mechanical relays, 144a and 148a, of FIG. 9.

The electric motor drive 268a cooperates with an identical electric motor drive, not shown, with the sawtooth generator 72 of FIG. 6, and with the change limiting means 223 of FIG. 7 for limiting the rate of change in the difference of power supplied to two electric motors, as described in conjunction with FIG. 9.

The electric motor drive 268a of FIG. 12 includes the operational amplifiers 104a and 106a of FIG. 9. The operational amplifiers 104a and 106a are connected to the potentiometer 76a, to the four volt source, and to ground by identically numbered and identically named parts as those of FIG. 9. The embodiment of FIG. 12 uses feedback resistors 270a and 272a to feed back the outputs of the amplifiers, 104a and 106a, to their respective inputs.

When the control lever 54 of FIGS. 1 and 2 is in its centered position, the wiper arm 96a of the potentiometer 76a is at the midpoint of the resistance, and the wiper arm 96a delivers four volts to the inputs of both of the operational amplifiers, 104a and 106a.

Since the amplifiers, 104a and 106a are differential amplifiers with four volts on both inputs, the outputs of both amplifiers, 104a and 106a, are at ground potential when the wiper arm 96a supplies four volts to both operational amplifiers, 104a and 106a.

As the wiper arm 96a is moved downwardly, the output of the amplifier 104a increases above ground potential; and as the wiper arm 96a is moved upwardly, the output of the amplifier 106a increases above ground potential. Notice that the amplifiers, 104a and 106a, cannot produce outputs simultaneously.

If, for instance, the amplifier 104a is producing an output, this output is compared to the sawtooth waveform of the sawtooth generator 72 by a comparator 274a and a pulse-width-modulated control signal is developed in a conductor 276a by the comparator 274a and a pull-up resistor 278a that is connected between the conductor 276a and the twelve volt source.

The pulse-width-modulated control signal is delivered to a transistor 290a by the conductor 276a. The pulse-width-modulated control signal is inverted and the level of the signal is shifted by the transistor 290a and by a pull-up resistor 292a which is connected between the transistor 290a and the twelve volt source.

The output of the transistor 290a is connected to FETS 294a and 296a. The FET 294a is an N channel enhancement mode MOSFET which turns on when its gate 298a is increased above ground potential; and the FET 296a is a P channel enhancement mode MOSFET which turns on when its gate 300a is decreased below its source potential.

When the wiper arm 96a of the potentiometer 76a is below the midpoint of the resistance, and the voltage on the wiper arm 96a is less than four volts, the output of the comparator 274a is high during the pulse which is developed by the comparator 274a, the output of the transistor 290a is low, the voltage to the gate 300a of the FET 296a is below the source voltage, the FET 296a is on, and a terminal 301a of the motor 26a is connected to the twelve volt source by the FET 296a.

In like manner, the output of a comparator 302a is connected to FETS 304a and 306a. THE FET 304a is an N channel enhancement mode MOSFET which turns on when its gate 308a is increased above ground potential; and the FET 306a is a P channel enhancement mode MOSFET which turns on when its gate 310a is decreased below its source potential.

Continuing the description of operation with the wiper arm 96a of the potentiometer 76a below the midpoint in its resistance, in this condition, there is no output from the comparator 302a, the output of a transistor 312a is high, the voltage to the gate 310a of the FET 306a is high, the FET 306a is off, the gate 308a of the FET 304a is high, the FET 304a is on, and the FET 304a connects a terminal 314a of the electric motor 26a to ground.

Thus, in the condition described, the FETS 296a and 304a cooperate to determine the direction of rotation of the electric motor 26a by making connections respectively to the terminals 301a and 314a of the electric motor 26a and the FET 296a connects the electric motor to the twelve volt source with pulse widths that are proportional to the positioning of the wiper arm 96a below the mid-point of the potentiometer 76a to provide a pulse-width-modulated driving voltage.

Continuing to describe the operation of the FIG. 12 embodiment, with a voltage on the wiper arm 96a that is less than four volts, the comparator 274a is supplying pulses of voltage that are pulse-width-modulated. However, between voltage pulses of the comparator 274a, the output of the comparator 274a is low, the output of the transistor 290a is high, the gate 300a of the FET 296a is at source voltage, the FET 296a is off, the gate 298a of the FET 294a is high, the FET 294a is on, and the FET 294a is connecting the terminal 301a of the electric motor 26a to ground.

So, between voltage pulses of the comparator 274a, the terminal 301a of the electric motor 26a is connected to ground by the FET 294a and the terminal 314a of the electric motor 26a is connected to ground by the FET 304a.

Therefore, the circuitry that has been described provides dynamic braking pulses 213a between pulses 207a of the pulse-width-modulated driving voltage 209a by shorting the electric motor 26a, and thereby causing the electric motor 26a to function as an electrically loaded generator.

Operation of the circuitry with a voltage of more than four volts on the wiper arm 96a functions in like manner as has been described for voltages of less than four volts on the wiper arm 96a, the difference being that the comparator 302a cooperates with the FETS 306a and 304a to provide connections that determine the direction of rotation of the electric motor 26a, that pulse the power, and that provide dynamic braking, and the circuitry to ground is completed by the FET 294a.

The output of the transistor 290a is coupled to the FETS 294a and 296a by circuitry that includes a coupling resistor 316a; and the output of the transistor 312a is coupled to the FETS 304a and 306a by circuitry that includes a coupling resistor 318a.

An increase in voltage at the gate 298a of the FET 294a, and a delay in turning on the FET 294a, is achieved by a diode 320a, a time-delay resistor 322a, and a parasitic capacitor 324a which is inherent in the design of the FET 294a, in the manner that has been described in conjunction with FIG. 9.

In like manner, a decrease in voltage at the gate 300a of the FET 296a below the source voltage, and a delay in turning on the FET 296a, is achieved by a diode 326a, a time-delay resistor 328a, and a parasitic capacitor 330a which is inherent in the design of the FET 296a.

The construction thus described provides a time-interval between the cessation of one voltage pulse of the pulse-width-modulated driving voltage and an adjacent one of the dynamic braking pulses, and a time-interval between the end of one braking pulse and the start of the next voltage pulse.

Thus, it can be seen that the electric motor drive of FIG. 12 provides the same advantages as the electric motor drive 90a of FIG. 9, and also eliminates the necessity of using mechanical relays, such as the relays 144a and 148a.

Referring again to FIGS. 8A, 8B, and 8C, the power pulses 207a are at an amplitude of the source voltage, which preferably is either 12 or 24 volts. The frequency of the sawtooth which is generated by the sawtooth generator 72 preferably is 125 hertz; so a period 331a of one complete cycle preferably is 0.008 seconds.

In a typical design the effective delays, 219a and 221a, are approximately 200 microseconds; and the amplitude of the braking pulses 213a is about one volt.

The braking pulse 213a is applied for a portion 233a of the no-power interval 217a; and the portion 233a is less than the no-power interval 217a by the effective delay 219a of the braking pulse 213a.

Referring now to FIG. 4, a conveyance, or electric wheelchair 360, is similar to the wheelchair 10 of FIGS. 1 and 2, but includes a drive unit 362a for driving a right wheel, or propulsion element 12a, and a similar drive unit, not shown, for driving the left wheel 12b of FIGS. 1 and 2.

The drive unit 362a includes the electric motor 26a and a power transmission 364a. A similar power transmission, not shown, is used for driving the left wheel 12b of FIGS. 1 and 2.

The electric motor 26a of FIG. 4 is identical to the electric motor 26a of the other drawings, except a motor shaft 366a is longer than shown in the other drawings. For simplicity, the number of the electric motor of FIG. 4 has been kept the same as the electric motors in the other drawings.

The power transmission 364a includes a first stage reduction 368a and a second stage reduction 370a. The first stage reduction includes a drive pulley 372 that is attached to the motor shaft 366a, a driven pulley 374, and a belt 376. The second stage includes a drive gear 378 and a driven gear 380.

The wheel 12a is rotatably attached to a mounting plate 382a of a wheelchair frame 384 by a shoulder bolt 386, a spacing washer 387, and a nut 388.

An adapter plate 390a of the drive unit 362a is attached to the mounting plate 382a of the wheelchair 360 by the shoulder bolt 386, the nut 388, and a bolt 392; and the motor 26a is attached to the adapter plate 390a by bolts 394.

Both the driven pulley 374 and the drive gear 378 are fixedly secured to an idler shaft 396. The idler shaft 396 is rotatably mounted to the adapter plate 390a by ball bearings 397, a housing 398, bolts 400, and a retaining ring 402.

The driven gear 380 includes a hub 404 that abuts the wheel 12a, and that is attached to the wheel 12a by bolts 406.

In a preferred design, the first stage reduction is 6:1; and the second stage reduction is 8:1.

Referring again to FIGS. 9, 10, and 12, the circuitry shown therein includes manual-propulsion mode switches 408a and 408b. When the switches 408a and 408b are in their open, or disengaged positions, as shown, the motors 26a and 26b cannot be shorted and made to provide dynamic braking.

Therefore, by opening the switches 408a and 408b the wheelchair 360 can be manually propelled without dynamic braking occurring. However, except when the switches 408a and 408b are opened, dynamic braking provides considerable safety from runaway conditions, even though a parking brake, not shown, but typically included on all wheelchairs, has inadvertently been left unset.

Further, by providing dynamic braking, as described herein, by providing means for disengaging the dynamic braking, as described above, and by providing an efficient drive unit, such as the drive unit 362a, it is not necessary to provide means for releasing the mechanical drive before manually-propelling the wheelchair.

There are two advantages: one is that the cost and complexity of a release mechanism for the power transmission is obviated; and the other is that the dynamic braking of the wheelchair is always effective to prevent runaway situations, except when the manual-propulsion switches are intentionally opened.

In actual tests, with the switches 408a and 408b open to establish the manually-propelled mode, with a wheelchair 360 that weighed 30.4 kilograms (67 pounds), and with an occupant that weighed 56.7 kilograms (125 pounds), it required 3.63 kilograms (8 pounds) to manually-propel the wheelchair with the drive unit 362a engaged at approximately 3.2 kilometers/hour (2 miles/hour), and 1.8 kilograms (4 pounds) to manually propel the wheelchair 360 with the drive unit disengaged.

It is believed that even this modest force that is required to manually-propel the wheelchair 360 can be reduced by further refinement of the design of the drive unit 362a.

In contrast, an electric wheelchair of a competitor, that weighs about 56.7 kilograms (125 pounds), with an occupant of 56.7 kilograms (125 pounds), required 10.0 kilograms (22 pounds) for manual propulsion. Other competitive designs of electric wheelchairs require such high forces to be manually propelled that it is virtually impossible to manually propel them.

In the parking mode, with the switches 408a and 408b closed, it required 10 kilograms (22 pounds) to manually propel the wheelchair 360 with an occupant of 56.7 kilograms (125 pounds) at 3.2 kilometers/hour (2 miles/hour).

Thus, the dynamic braking, of the embodiment which has been described, provided a decelerating force of about 6.3 kilograms (14 pounds) at 3.2 kilometers/hour (2 miles/hour); and the dynamic braking is considerably greater at larger speeds. Therefore, the dynamic braking of the present invention provides considerable safety from dangerous runaway conditions.

Referring again to FIGS. 1 and 2, the wheelchair 10 includes hand-rims 410a and 410b. The hand-rims 410a and 410b are also used with the wheelchair 360. Therefore, the hand-rims 410a and 410b serve as a manual self-propelling means for use in a propulsion mode that includes opening the switches 408a and 408b.

For purposes of understanding the appended claims, a first electric embodiment of the invention includes a motor control 332a which includes all of the components of the motor drive 90a of FIG. 9 except for the potentiometer 76a and the electric motor 26a, and includes the sawtooth generator 72 of FIG. 6.

A second electric embodiment includes a motor control 334a, includes the sawtooth generator 72 of FIG. 6, and includes all of the components of the motor drive 268a of FIG. 12 except for the potentiometer 76a and the electric motor 26a.

In the hydraulic embodiment, a motor control 336a includes the sawtooth generator 72 of FIG. 6, and includes all of the components of the motor drive 230a of FIG. 11 except for the potentiometer 76a and the fluid motor 232a.

While the motors 26a and 232a have been shown as rotary motors, it will be apparent that the present invention will provide differential control limiting for changes in linear velocity of linear motors as well. Therefore, the word "motor" is to be construed in its broader sense of an actuator which is either rotary or linear.

The hydraulic embodiment of FIG. 11 includes a source of fluid power 338a which includes the pump 242a and the reservoir 244a.

The motor control 332a of FIGS. 6 and 9 includes both a power control, or driving voltage control, 340a and an electronic control 342a. The power control 340a includes the transistors 138a and 140a, the transistor 198a, the FET 168a, and the relays 144a and 148a.

The electronic control 342a of FIGS. 6 and 9 includes the amplifiers 104a and 106a, the comparators 130a and 132a, the potentiometer 172a, the comparator 176a, and the sawtooth generator 72.

The motor control 334a of FIGS. 6 and 12 includes both a power control, or driving voltage control, 344a, and an electronic control 346a.

In like manner, the motor control 336a of FIGS. 6 and 11 includes both a power control 348a and electronic control 350a.

The power control 344a of FIG. 12 includes the transistors 290a and 312a and the FETS 296a and 304a; and the power control 348a of FIG. 11 includes the transistor 138a, the transistor 140a, the FET 168a, the directional control valve 234a, and the proportional output valve 248a.

The manual control 352, includes the potentiometers 76a and 76b, the control lever 54, and any mechanism that interconnects the control lever 54 to the potentiometers 76a and 76b.

The embodiment of FIG. 9 includes a motor loading means 354a which includes the FET 170a, and the embodiment of FIG. 12 includes a motor loading means 356a which includes the FET 294.

The sawtooth generator 72 of FIG. 6 cooperates with the comparator 176a of FIG. 9 to provide a pulse-width modulator. In like manner, the sawtooth generator 72 cooperates with the comparator 274a of FIG. 12 to provide a pulse-width modulator.

The sawtooth generator 72 also cooperates with the comparator 274a to modulate the width 215a of the dynamic braking pulses 213a because modulating the pulses 207a of the driving voltage 209a inversely modulates the width 215a of the dynamic braking pulses.

In summary, the present invention provides apparatus and method for providing a conveyance, a motor drive, and a control, in which: dynamic braking is provided by shorting the motor winding during a portion of the interval between power pulses; differential control limiting is provided that assures ease and accuracy of manual control by limiting the rate of change in the difference of power that can be supplied to one motor with respect to the other motor; power-off braking is achieved by shorting the motor winding when no power pulses are being supplied to the motors; extended relay life is achieved by transmitting power to the motors only when the relay contacts are closed; and a solid-state switching device is provided that is controlled by a signal in a single conductor and that provides an effective delay in switching.

Differential control limiting is applicable to both electric and fluid motors; dynamic braking is applicable to any electric motor that can function as an electrically loaded generator and that is driven by voltage pulses whether width-modulated, amplitude-modulated, or unmodulated; power-off braking is applicable to various uses, particularly with reversing motors; and the circuitry for increasing relay life is particularly applicable to reversible electric motors.

While specific apparatus and parameters have been disclosed in the preceding description, and while numbers of specific parts that have been described in the specification have been included in the claims, it should be understood that these specifics have been given for the purpose of disclosing the principles of the present invention and that many variations thereof will become apparent to those who are versed in the art. Therefore, the scope of the present invention is to be determined by the appended claims and the recitations thereof.

INDUSTRIAL APPLICABILITY

The present invention is applicable to conveyances in which left and right traction elements are separately and variably controlled by left and right electric or fluid motors, is applicable to conveyances in which dynamic braking of electric motors is needed, and is applicable to conveyances in which the operator has hand tremors.

What is claimed is:

1. A conveyance (360) having a propulsion element (12a), having an electric motor (26a), having a power transmission (364a) that drivingly connects said electric motor to said propulsion element, having motor control means (332a or 334a) for supplying a driving voltage (209a) to said motor (26a), and having means (56) for selectively obviating said supplying of said driving voltage to said electric motor, the improvement which comprises:
    means, comprising said power transmission, for allowing said propulsion element to drive said motor;
    parking mode means (152a and 154a) for making said motor function as an electrically loaded generator when said propulsion element is driving said motor and said supplying of said driving voltage is obviated; and
    manual propelling means (408a) for selectively inactivating said parking mode means; whereby
    said conveyance is manually propelled, and said propulsion element drives said motor without said motor (26a) functioning as an electrically-loaded generator.

2. A conveyance (360) as claimed in claim 1 in which said driving voltage (209a) comprises a plurality of pulses (207a).

3. A conveyance (360) as claimed in claim 1 in which said motor control means (332a or 334a) comprises a solid-state device (168a or 170a); and
    said motor control means includes means (210a and 214a, or 212a and 216a) for making said solid-state device turn on more slowly than said solid-state device turns off.

4. A conveyance (360) as claimed in claim 1 in which said motor control means (332a or 336a) comprises first (168a) and second (170a) solid-state devices (170a); and said motor control means includes means, comprising a resistor (214a or 216a) and a diode (210a or 212a), for making one of said solid-state devices (168a or 170a) turn on more slowly than the other of said solid-state devices (170a or 168a) turns off.

5. A conveyance (360) as claimed in claim 1 in which said conveyance includes a second propulsion element (12b) and a second electric motor (26b) that is drivingly connected to said second propulsion element, and said conveyance further comprises:
    means, comprising a second motor control (332a or 334a) that is operatively connected to said second motor, for supplying a driving voltage (209a) to said second motor;
    means (352) for separately and selectively modulating (211a) said driving voltages supplied to said motors; and
    means (223) for limiting the rate of change in differences in modulating said driving voltage supplied to said motors while permitting larger changes in modulating said driving voltage when said changes in modulating are generally equal.

6. A conveyance (360) as claimed in claim 1 in which said driving voltage (209a) comprises a plurality of pulses (207a);
    said conveyance comprises means (354a or 356a), being operatively connected to said motor (26a), for applying a plurality of electrical dynamic braking pulses (213a) to said motor (26a); and
    said motor control means (332a or 334a) comprises means for interspersing said dynamic braking pulses (213a) and said driving-voltage pulses (207a).

7. A conveyance (360) as claimed in claim 6 in which said motor control means (332a or 334a) includes means (94a) for modulating (211a or 215a) one of said plurality of pulses (207a or 213a).

8. A conveyance (360) as claimed in claim 6 in which said motor (26a) includes a motor winding (150a) having first (158a) and second (166a) ends; and
    said means (354a or 356a) for applying said dynamic braking pulses (213a) to said motor (26a) comprises means (170a or 294a) for providing an electrical flow path between said ends (158a and 166a) of said motor winding (150a).

9. A conveyance (360) as claimed in claim 6 in which said motor (26a) includes a motor winding (150a) having first (158a) and second (166a) ends;
    said means (354a or 356a) for applying said dynamic braking pulses (213a) to said motor (26a) comprises means (170a or 294a) for providing an electrical flow path between said ends (158a and 166a) of said motor winding (150a);
    said motor control means (332a or 334a) includes means (94a) for pulse-width modulating (211a and 215a) said driving-voltage pulses (207a); and
    said motor control means includes means (168a and 170a) for inversely pulse-width modulating said dynamic braking pulses (213a) with respect to said driving-voltage pulses.

10. A conveyance (360) as claimed in claim 6 in which said motor control means (332a or 334a) comprises a first solid-state device (168a);
    said means (354a or 356a) for applying said dynamic braking pulses (213a) to said motor (26a) comprises a second solid-state device (170a); and
    said motor control means includes means, comprising a resistor (214a or 216a) and a diode (210a or 212a), for making one of said solid-state devices (168a or 170a) turn on more slowly in response to a change in the magnitude of a signal in one direction than the other of said solid-state devices (170a or 168a) turns off in response to a change in the magnitude of said signal in said one direction.

11. A conveyance (360) as claimed in claim 6 in which said motor control means (332a or 334a) includes means, comprising a resistor (214a or 216a) and a diode (210a or 212a), for effectively providing an interval (221a or 219a) between one of said pulses (207a) of driving voltage (209a) and an adjacent one of said dynamic braking pulses (213a).

12. A conveyance (360) as claimed in claim 6 in which said motor control means (332a or 334a) comprises a solid-state device (168a, 170a or 294a) having a parasitic capacitance (218a or 220a); and said motor control means includes means, comprising a resistor (214a or 216a), a diode (210a or 212a), and said parasitic capacitance, for effectively providing an interval (221a or 219a) between one of said pulses (207a) of driving voltage (209a) and an adjacent one of said dynamic braking pulses (213a).

13. A conveyance (360) as claimed in claim 6 in which said conveyance includes a second propulsion element (12b) and a second electric motor (26b) that is drivingly connected to said second propulsion element, and said conveyance comprises:

means, comprising a second motor control (332a or 334a) that is operatively connected to said second motor, for supplying pulses (207a) of a driving voltage (209a) to said second motor;

means (352) for separately and selectively modulating (211a) said pulses of driving voltages supplied to said motors; and means (223) for limiting the rate of change in differences in modulating said pulses of driving voltage supplied to said motors while permitting larger changes in modulating said pulses when said changes in modulating are generally equal.

14. A method specially adapted for electrically propelling, braking, and manually-propelling a conveyance (360) that includes a propulsion element (12a), an electric motor (26a), and a power transmission (364a) that drivingly connects said electric motor to said propulsion element, which method comprises the steps of:

(a) supplying a driving voltage (209a) to said motor (26a);

(b) selectively isolating (56) said motor from said driving voltage;

(c) making said power transmission power reversible, whereby said propulsion element drives said motor;

(d) causing said motor to function as an electrically loaded generator when said propulsion element drives said motor;

(e) selectively inactivating said causing step; and (f) manually propelling said conveyance whereby said propulsion element drives said motor without said motor functioning as an electrically loaded generator.

15. A method as claimed in claim 14 in which said conveyance (360) includes a solid-state device (168a or 170a); and said method further comprises the step of making said solid-state device turn on more slowly than said solid-state device turns off.

16. A method as claimed in claim 14 in which said method includes first (168a) and second (170a) solid-state devices (170a); and said method further comprises the step of making one of said solid-state devices (168a or 170a) turn on more slowly in response to a change in magnitude of a signal in one direction than the other of said solid-state devices (170a or 168a) turns off in response to a change of said signal in said one direction.

17. A method as claimed in claim 14 in which said conveyance (360) includes a second propulsion element (12b) and a second electric motor (26b) that is drivingly connected to said second propulsion element and that is supplied with a driving voltage (209a), and said method further comprises the steps of:

(a) selectively and separately modulating said driving voltages supplied to said motors (28a and 28b);

(b) limiting the rate of change in differences in modulating said driving voltage supplied to said motors; and (c) permitting larger changes in modulating said driving voltage when said changes in modulating are generally equal.

18. A method as claimed in claim 14 in which the step of supplying said driving voltage (209a) comprises supplying a plurality of driving-voltage pulses (207a), and said method further comprises the steps of:

(a) applying a plurality of electrical dynamic braking pulses (213a) to said motor (26a); and (b) interspersing said dynamic braking pulses (213a) and said driving-voltage pulses (207a).

19. A method as claimed in claim 18 in which said method further comprises the step of modulating (211a or 215a) one of said plurality of pulses (207a or 213a).

20. A method as claimed in claim 18 in which said method further comprises the steps of:

(a) pulse-width modulating (215a) said driving-voltage pulses (207a); and (b) inversely pulse-width modulating (211a and 215a) said dynamic braking pulses (213a) with respect to said modulating of said driving-voltage pulses.

21. A method as claimed in claim 18 in which said conveyance includes first (168a) and second (170a) solid-state devices (170a):

(a) said method further comprises the step of providing an interval between said pulses; and (b) said providing step comprises the step of making one of said solid-state devices turn on more slowly than said one solid-state device turns off.

22. A method as claimed in claim 18 in which said method further comprises the step of providing an interval (221a or 219a) between one of said pulses (207a) of said driving voltage (209a) and an adjacent one of said dynamic braking pulses (213a), and said providing step comprises:

(a) restricting the rate of increase of a first signal;

(b) allowing a greater rate of decrease of said first signal than said restricted rate of increase;

(c) restricting the rate of decrease of a second signal; and (d) allowing a greater rate of increase of said second signal than said restricted rate of decrease.

23. A method as claimed in claim 18 in which said conveyance (360) includes a second propulsion element (12b) and a second electric motor (26b) that is drivingly connected to said second propulsion element, and said method further comprises the steps of:

(a) supplying pulses (207a) of a driving voltage (209a) to said second motor;
(b) separately and selectively modulating (211a) said pulses of driving voltages supplied to said motors;
(c) limiting the rate of change in differences in modulating said pulses of driving voltage supplied to said motors; and
(d) permitting larger changes in modulating said pulses when said changes in modulating are generally equal.

* * * * *